United States Patent [19]
Herman

[11] Patent Number: 6,015,215
[45] Date of Patent: *Jan. 18, 2000

[54] NON-OBSTRUCTIVE, AUXILIARY REAR VIEW MIRROR ASSEMBLY AND MOUNTING APPARATUS

[76] Inventor: Michael J. Herman, 6814 Still Meadow, Houston, Tex. 77389

[*] Notice: This patent issued on a continued prosecution application filed under 37 CFR 1.53(d), and is subject to the twenty year patent term provisions of 35 U.S.C. 154(a)(2).

[21] Appl. No.: 08/810,628

[22] Filed: Feb. 28, 1997

[51] Int. Cl.[7] ....................................................... G02B 5/10
[52] U.S. Cl. ........................... 359/864; 248/467; 359/841
[58] Field of Search ................................... 359/850, 864, 359/866, 871, 883, 841; 248/467

[56] References Cited

U.S. PATENT DOCUMENTS

| | | | |
|---|---|---|---|
| 3,104,274 | 9/1963 | King | 359/864 |
| 3,131,250 | 4/1964 | Ely | 359/850 |
| 4,139,269 | 2/1979 | Backenkohler | 359/850 |
| 4,182,552 | 1/1980 | Feinbloom | 359/837 |
| 4,200,359 | 4/1980 | Lawson | 359/850 |
| 4,223,983 | 9/1980 | Bloom | 359/864 |
| 4,311,363 | 1/1982 | Marsalka et al. | 359/864 |
| 4,439,013 | 3/1984 | Hagn et al. | 359/507 |
| 4,678,294 | 7/1987 | Van Nostrand | 359/864 |
| 4,834,521 | 5/1989 | Dubs | 359/850 |
| 4,863,254 | 9/1989 | Dyer | 359/850 |
| 4,890,908 | 1/1990 | Casey | 359/865 |
| 4,932,770 | 6/1990 | Caravaty | 359/866 |
| 5,044,739 | 9/1991 | do Espirito Santo | 359/864 |
| 5,107,375 | 4/1992 | Fisher | 359/850 |
| 5,432,640 | 7/1995 | Gilbert et al. | 359/841 |
| 5,432,643 | 7/1995 | Huang | 359/864 |

FOREIGN PATENT DOCUMENTS

| | | | |
|---|---|---|---|
| 1285410 | 7/1991 | Canada . | |
| 0396930 | 11/1990 | European Pat. Off. | 359/850 |
| 562110 | 5/1975 | Switzerland . | |
| 2252946 | 8/1992 | United Kingdom | 359/850 |

*Primary Examiner*—Cassandra Spyrou
*Assistant Examiner*—Mark A. Robinson
*Attorney, Agent, or Firm*—David M. O'Brian

[57] ABSTRACT

A non-obstructive, auxiliary rear view mirror assembly and mounting apparatus to generally provide a driver of a vehicle with a full view of the vehicle's blind spot. The non-obstructive, auxiliary rear view mirror assembly and mounting apparatus is preferably mounted to a non-mirror reflective, support member of a factory-mounted side view mirror assembly. The support member being positioned between a reflective mirror surface of the factory-mounted side view mirror assembly and an exterior surface of a vehicle. The non-obstructive, auxiliary rear view mirror assembly and mounting apparatus is preferably mounted to the support member in the absence of engagement to or contact with, the reflective mirror surface of the factory-mounted side view mirror assembly, and in the absence of obstructing the driver's view of any portion of the reflective mirror surface of the factory-mounted side view mirror assembly, while generally providing the driver with a full view of the vehicle's blind spot.

10 Claims, 7 Drawing Sheets

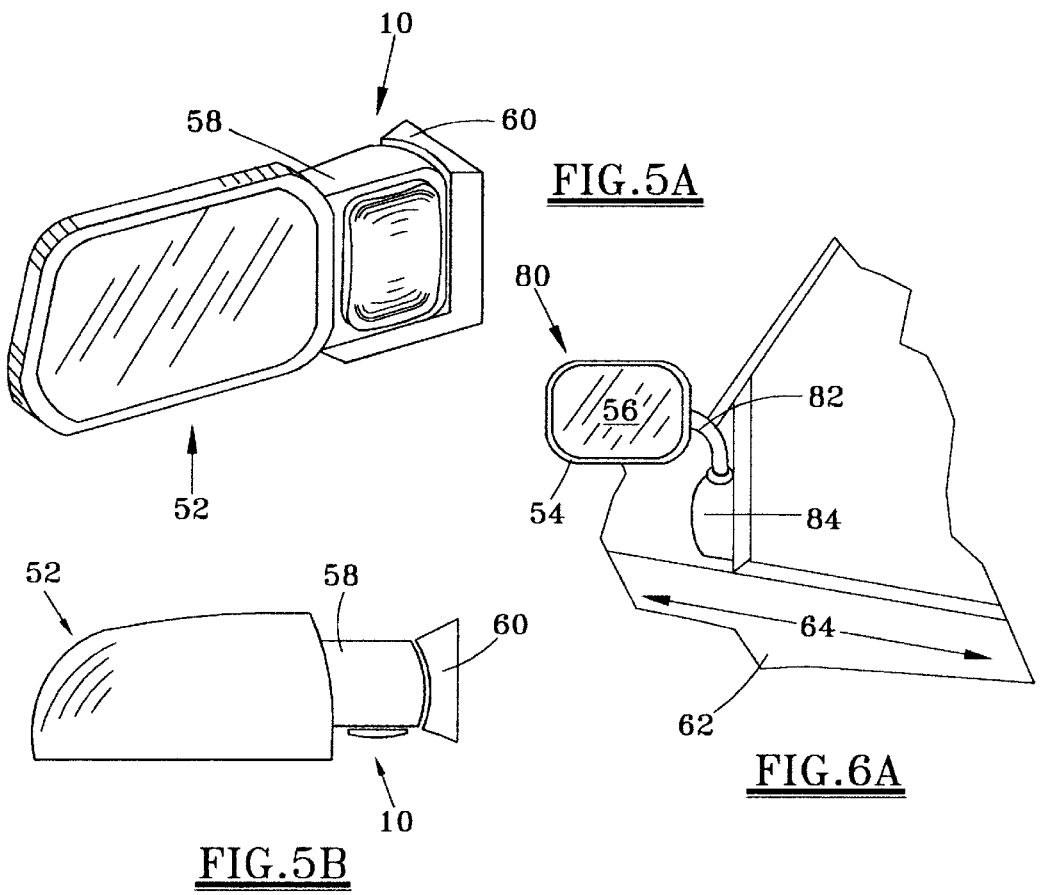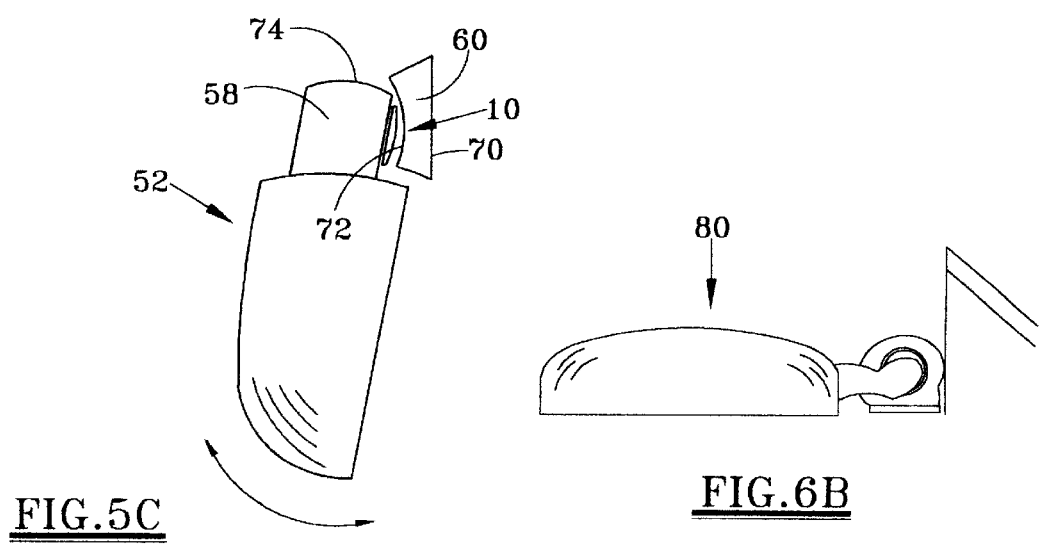

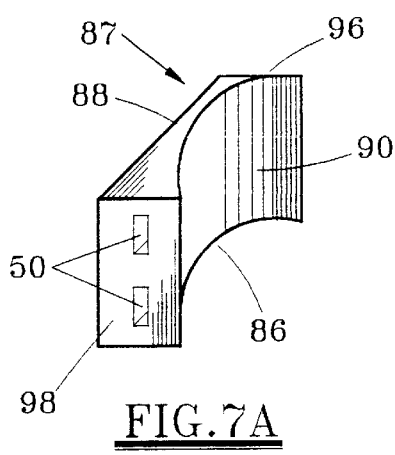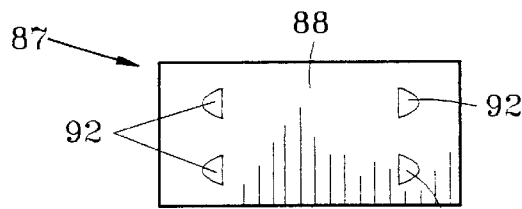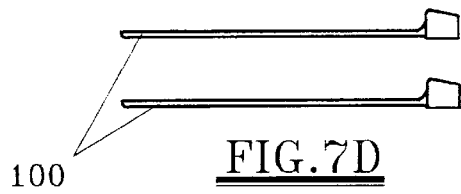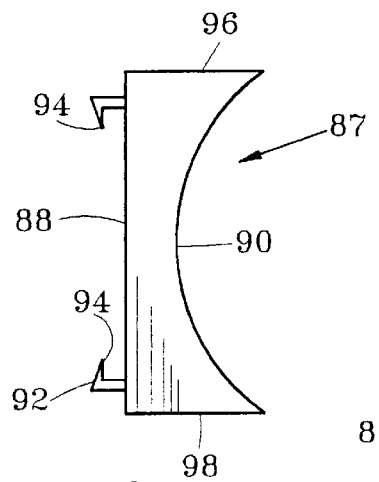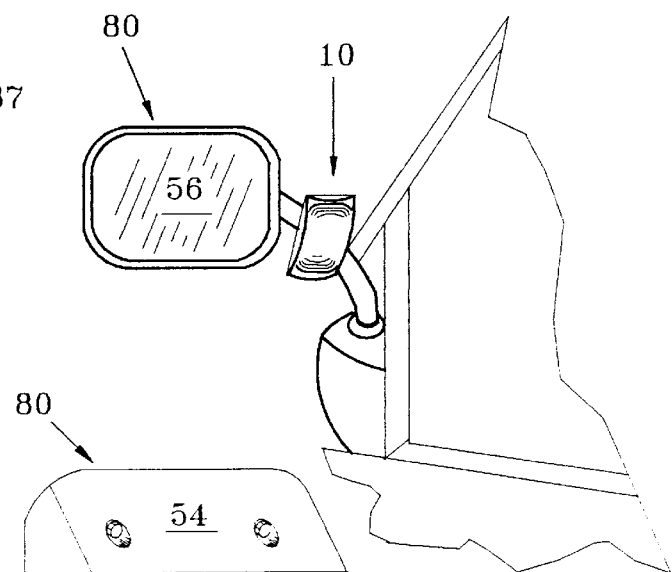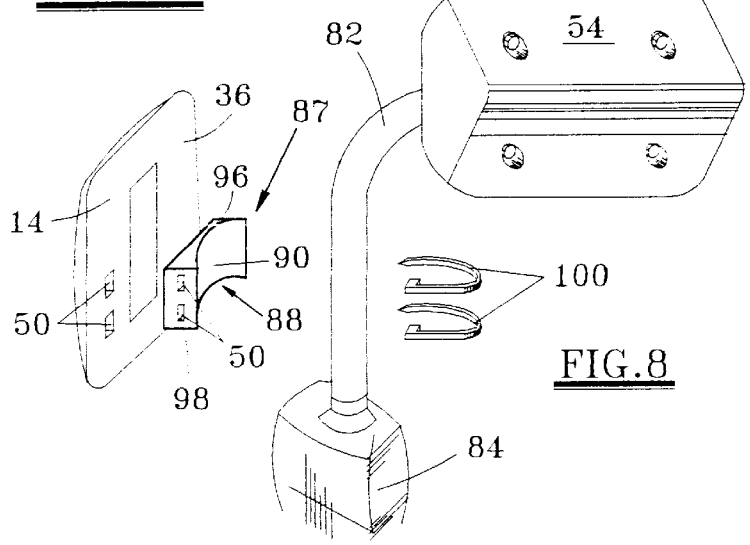

NON-OBSTRUCTIVE, AUXILIARY REAR VIEW MIRROR ASSEMBLY AND MOUNTING APPARATUS

FIELD OF THE INVENTION

The present invention relates generally to an automotive auxiliary rear view mirror assembly. Specifically, the present invention relates to a non-obstructive, auxiliary rear view mirror assembly and non-obstructive mounting apparatus for use with vehicles. The non-obstructive, auxiliary rear view mirror assembly and non-obstructive mounting apparatus is preferably mounted on a non-mirror reflective support member located between a reflective mirror surface of a factory-mounted side view mirror and an exterior surface of a vehicle, in the absence of attachment to or contact with, the reflective mirror surface of the factory-mounted side view mirror assembly, and in the absence of obstructing the driver's view of any portion of the reflective mirror surface of the factory-mounted side view mirror assembly, while generally providing the driver of the vehicle with a full view of the area adjacent to the vehicle, commonly known as the "blind spot."

BACKGROUND OF THE INVENTION

Most vehicles include at least one factory-mounted side view mirror assembly. Generally, factory-mounted side view mirrors are planar in construction and provide the driver of the vehicle with a minimal field of vision of the area immediately adjacent to the middle, side portion of the vehicle and the continuation of that view, somewhat past the vehicle. In particular, it is known that roughly the axial boundary beginning at about six feet away from both side exterior surfaces of the vehicle and continuing in a direction away from the vehicle, and roughly the lateral boundary beginning at a point at or slightly behind the driver and continuing well behind the vehicle's back bumper, is difficult, if not impossible, for the driver to see using only a standard factory-mounted side view mirror. This area is commonly referred to as the vehicle's "blind spot." Additional areas of the blind spot may also include the road surface adjacent to the vehicle and the extreme upper and lower portions of the side of the vehicle and the area above the vehicle. There is a continuing concern to drivers of all types of vehicles, pertaining to the obstructed and/or inadequate view of the vehicle's blind spot. Having sufficient view of the blind spot is especially critical when a driver of a vehicle is attempting to make a lane change, or is passing a vehicle in an adjacent or oncoming lane of traffic, and when backing the vehicle. Although attempts have been made to overcome this problem, thus far, the devices submitted do not provide a full view of the vehicle's blind spot in the absence of creating other hazards for the driver. Auxiliary rear view mirror devices which adhere to and obstruct the reflective mirror surface of the factory-mounted side view mirror assembly are generally known, as taught in U.S. Pat. No. 3,104,274, to King and U.S. Pat. No. 4,890,908, to Casey. These auxiliary mirror devices and/or their mounting brackets, require attachment to, interference with and obstruction of, the reflective mirror surface of the factory-mounted side view mirror assembly, thereby compromising the driver's field of vision through the factory-mounted side view mirror, while generally failing to provide a full view of the vehicle's blind spot. The mounting of these auxiliary mirror devices and/or their mounting brackets on the reflective mirror surface of the factory-mounted side view mirror assembly may also create confusion and/or mislead the driver of the vehicle, with regard to distance and/or the current traffic situation, due to the overlapped mounting and alignment of these devices on the reflective surface of the factory-mounted side view mirror assembly. Moreover, the mounting of these auxiliary mirror devices and/or their mounting brackets on the reflective mirror surface of the factory-mounted side view mirror assembly, may expose the auxiliary mirror, or some portion of it, to oncoming excessive wind forces, airborne road debris and unintentional contact with various objects, to which the front of the vehicle may otherwise be exposed, resulting in damage to the auxiliary mirror device and/or the unintentional separation of the auxiliary mirror device from the reflective mirror surface of the factory-mounted side view mirror. Additionally, the mounting of these auxiliary mirror devices on the reflective mirror surface of collapsible and/or folding-type factory-mounted side view mirrors, which are common today, may cause damaging contact to the factory-mounted side view mirror, the auxiliary mirror device and/or to the exterior surface of the vehicle, when the factory-mounted side view mirror is folded or becomes collapsed. Further, damage to the auxiliary mirror device or separation of the auxiliary mirror device from the vehicle, may be the proximate cause of physical injury to the driver of the vehicle, thereby adversely affecting the control and/or operation of the vehicle. Therefore, there is a need in the industry for an auxiliary rear view mirror that avoids the problems of the known auxiliary rear and side view mirrors.

SUMMARY OF THE INVENTION

To achieve the foregoing features and advantages and in accordance with the purpose of the invention as embodied and broadly described herein, a preferred embodiment non-obstructive, auxiliary rear view mirror assembly and mounting apparatus, and more particularly, a non-obstructive, auxiliary rear view mirror assembly and non-obstructive mounting apparatus, which generally provides the driver of a vehicle with a full view of the vehicle's blind spot and generally overcomes the above-identified concerns is presented.

It is an object of the present invention to provide a non-obstructive, auxiliary rear view mirror assembly including a non-circular, convex mirror body, a mounting bracket to receive the convex mirror body and a non-obstructive mounting apparatus which generally provide a full view of the vehicle's blind spot.

Yet another object of the present invention is to provide a non-obstructive, auxiliary rear view mirror assembly including a non-circular, convex mirror body, a mounting bracket to receive the convex mirror body and a non-obstructive mounting apparatus which generally provide a full view of the vehicle's blind spot, wherein the non-obstructive convex mirror body and mounting bracket are preferably mounted on a support member located between the reflective mirror surface of the factory-mounted side view mirror and the exterior side of the vehicle.

Still another object of the present invention is to provide a non-obstructive, auxiliary rear view mirror assembly including a non-circular, convex mirror body, a mounting bracket to receive the convex mirror body and a non-obstructive mounting apparatus which generally provide a full view of the vehicle's blind spot, wherein the auxiliary convex mirror body, mounting bracket and mounting apparatus is preferably mounted on a support member located between the reflective mirror surface of the factory-mounted side view mirror assembly and the exterior side of the vehicle, in the absence of obstruction or interference of any kind, with the reflective mirror surface of the factory-mounted side view mirror assembly.

Yet another object of the present invention is to provide a non-obstructive, auxiliary rear view mirror assembly including a convex mirror body, a mounting bracket to receive the convex mirror body and non-obstructive mounting apparatus which generally provide a full view of the vehicle's blind spot, wherein the auxiliary convex mirror body, mounting bracket and mounting apparatus are preferably mounted to a support member which may, for example, be a non-mirror reflective housing or support member of the factory-mounted side view mirror assembly, the support member being located between the reflective mirror surface of the factory-mounted side view mirror and the exterior side of the vehicle, in the absence of obstruction or interference of any kind, with the reflective mirror surface of the factory-mounted side view mirror assembly.

An additional object of the present invention is to provide a non-obstructive, auxiliary rear view mirror assembly including a non-circular, convex mirror body, a mounting bracket to receive the convex mirror body and a mounting apparatus which generally provide a full view of the vehicle's blind spot, wherein the non-circular, convex mirror body, mounting bracket and mounting apparatus are preferably mounted on a support member located between the reflective surface of the factory-mounted side view mirror assembly and the exterior side of the vehicle, in the absence of adversely impacting or decreasing the driver's field of vision through the reflective mirror surface of the factory-mounted side view mirror assembly.

It is another object of the present invention to provide a non-obstructive, auxiliary rear view mirror assembly including a non-circular, convex mirror body, a mounting bracket to receive the convex mirror body and a mounting apparatus, which generally provide a full view of the vehicle's blind spot, in the absence of contact with or obstruction of the reflective mirror surface of the factory-mounted side view mirror assembly, wherein the mounting apparatus generally includes a pressure sensitive, double-sided, adhesive strip where a first side of the strip is adhesively affixed to a back portion of the mounting bracket, and a second side of the strip is adaptable for adhesive engagement with a non-mirror reflective support member of the factory-mounted side view mirror assembly.

Yet another object of the present invention is to provide a non-obstructive, auxiliary rear view mirror assembly including a non-circular, convex mirror body, a mounting bracket to receive the convex mirror body and a mounting apparatus, which generally provide a full view of the vehicle's blind spot, in the absence of contact with or obstruction of the reflective mirror surface of the factory-mounted side view mirror assembly, wherein the mounting of the auxiliary rear view mirror assembly includes a first alternate embodiment mounting apparatus and at least two tie straps in operative engagement with at least two tie strap securing eyelets provided by the mounting bracket, wherein the first embodiment mounting apparatus is mechanically attached to the back portion of the mounting bracket, such that engagement of the at least two straps with the at least two eyelets, securely mounts the non-obstructive, auxiliary rear view mirror assembly with a non-mirror reflective support member of the factory-mounted side view mirror assembly.

Still another object of the present invention is to provide two non-obstructive, auxiliary rear view mirror assemblies including two non-circular, convex mirror bodies, two mounting brackets, each mounting bracket to receive a respective convex mirror body and two respective mounting apparatuses, working in combination, wherein a first auxiliary rear view mirror assembly and mounting apparatus is preferably mounted on a support member located between the reflective mirror surface of a factory-mounted side view mirror and the exterior surface of the vehicle on the driver's side of the vehicle, in the absence of contacting or obstructing the reflective mirror surface of the driver's side factory-mounted side view mirror, and a second auxiliary rear view mirror assembly and mounting apparatus is preferably mounted on a support member located between the reflective mirror surface of a factory-mounted side view mirror and the exterior surface of the vehicle on the passenger's side of the vehicle, in the absence of contacting or obstructing the reflective mirror surface of the passenger's side factory-mounted side view mirror, wherein the combination of the first and second non-obstructive auxiliary rear view mirror assemblies and respective, mounting apparatuses, generally provide a full view of the vehicle's blind spot, on both sides of the vehicle, in the absence of obstructing or otherwise adversely impacting the reflective mirror surface of any factory-mounted side view mirror assembly.

Another object of the present invention is to provide a non-obstructive, auxiliary rear view mirror assembly including a non-circular, convex mirror body, a mounting bracket to receive the convex mirror body and a mounting apparatus, which generally provide a full view of the vehicle's blind spot, in the absence of contact with or obstruction of the reflective mirror surface of the factory-mounted side view mirror assembly, wherein the auxiliary rear view mirror assembly and mounting apparatus may be mounted to a non-mirror reflective support member of a collapsible factory-mounted side view mirror assembly in such a manner that the collapsing of the factory-mounted side view mirror assembly does not damage the reflective mirror surface of the non-circular convex mirror, nor any portion of the factory-mounted side view mirror assembly.

Other improvements of the present invention will become readily apparent to those skilled in the art from the following detailed description, wherein the preferred embodiments of the invention are illustrated and described and the best mode contemplated of carrying out the invention is disclosed. As will be realized, the invention is capable of different embodiments, and its several details are capable of modifications in various respects, all without departing from the spirit and scope of the invention. Accordingly, the drawings and descriptions thereof are to be regarded as illustrative in nature, and not as restrictive.

BRIEF DESCRIPTION OF THE DRAWINGS

The accompanying drawings which are incorporated into and constitute a part of this specification, illustrate a preferred embodiment of the invention and together with the general description of the invention given above and the detailed description of the preferred embodiment given below, serve to explain the principals of the invention.

FIG. 5A is a perspective view of the driver's side, factory-mounted side view mirror assembly, wherein the present invention is mounted to a support member of the factory-mounted side view mirror assembly.

FIG. 5B is a top view of FIG. 5A.

FIG. 5C is a top view of a collapsible factory-mounted side view mirror assembly in its partially collapsed position, with the present invention mounted to a support member of the factory-mounted side view mirror assembly.

FIG. 6A is a perspective view of a first alternate embodiment factorymounted side view mirror assembly.

FIG. 6B is a top view of FIG. 6A.

FIG. 7A is a perspective view of a first alternate embodiment non-obstructive, mounting bracket alternatively used to mount the present invention to the first alternate embodiment factory-mounted side view mirror, shown in FIG. 6A.

FIG. 7B is a front view of the first side of the first alternate embodiment non-obstructive, mounting bracket of FIG. 7A.

FIG. 7C is a top view of the mounting bracket illustrated in FIG. 7A.

FIG. 7D is a side view of the tie straps used to secure the first alternate embodiment mounting bracket shown in FIG. 7A to the first alternate embodiment factory-mounted side view mirror assembly shown in FIG. 6A.

The above general description and the following detailed description are merely illustrative of the generic invention and additional modes, advantages and particulars will be readily suggested to those skilled in the art without departing from the spirit and scope of the invention.

DETAILED DESCRIPTION OF THE INVENTION

Figure 1A:
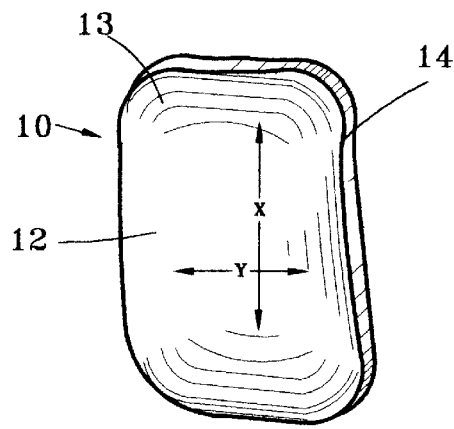
FIG. 1A is a perspective view of the preferred embodiment non-obstructive, auxiliary rear view mirror assembly, made the subject of the present invention.
Figure 1B:
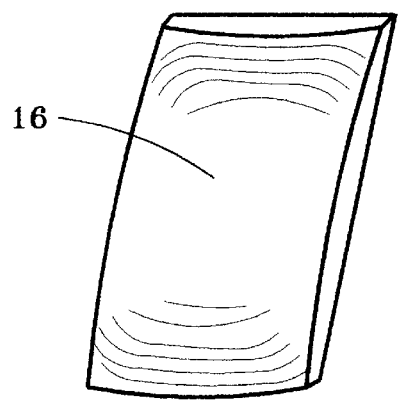
FIG. 1B is a front view of the first alternate embodiment non-obstructive, non-circular, auxiliary rear view mirror assembly.
Figure 1C:
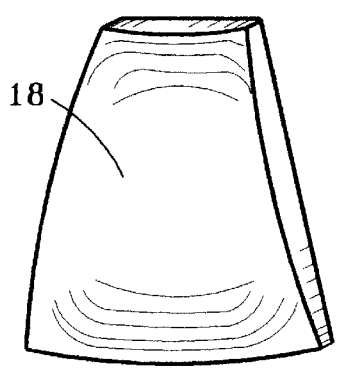
FIG. 1C is a front view of the second alternate embodiment non-obstructive, non-circular, auxiliary rear view mirror assembly.
Figure 1D:
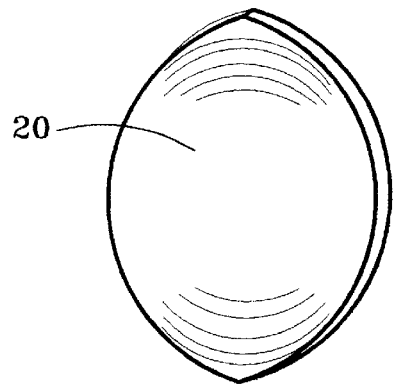
FIG. 1D is a front view of the third alternate embodiment non-obstructive, non-circular, auxiliary rear view mirror assembly.
Figure 1E:
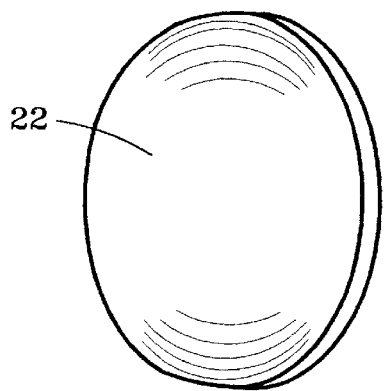
FIG. 1E is a front view of the fourth alternate embodiment non-obstructive, non-circular, auxiliary rear view mirror assembly.
Figure 1F:
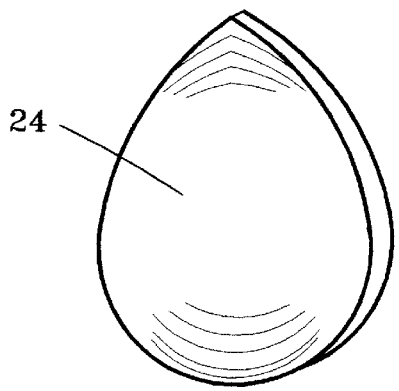
FIG. 1F is a front view of the fifth alternate embodiment non-obstructive, non-circular, auxiliary rear view mirror assembly.

With reference to the drawings wherein like parts are designated by like numerals, FIG. 1A illustrates the present invention, a preferred embodiment non-obstructive, auxiliary rear view mirror assembly and mounting apparatus (not shown) 10. The preferred embodiment 10 generally includes a non-circular mirror body 12, having an outwardly protruding convex reflective mirror surface 13 and a corresponding non-obstructive mirror body mounting bracket 14 to retain and secure the mirror body 12. The convex mirror body 12 and the mounting bracket 14 may preferably be constructed of plastic and other light weight, inexpensive material. The non-circular, convex mirror body 12 generally includes a longer, vertical or X axis X as compared to a shorter, horizontal or Y axis Y, thus generally providing a non-circular character to the mirror body 12, which is important in overcoming the providing a full view of the vehicle's blind spot (not shown). Although the present preferred embodiment mirror body 12 may be described as being non-circular or trapezium-shaped, FIGS. 1B–1F illustrate numerous alternate embodiment, non-circular, convex mirror body configurations 16, 18, 20, 22, 24, including a parallelogram-shaped auxiliary convex mirror body 16 as shown in FIG. 1B, a trapezoid-shaped auxiliary convex mirror body 18 as shown in FIG. 1C, a marquis-shaped auxiliary convex mirror body 20 as shown in FIG. 1D, a oval-shaped auxiliary convex mirror body 22 as shown in FIG. 1E, and a pear-shaped auxiliary convex mirror body 24 as shown in FIG. 1E.

Figure 2A:
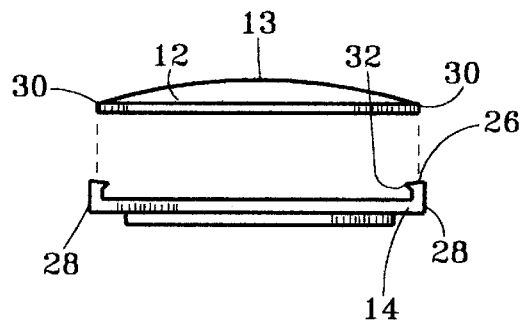
FIG. 2A is an exploded, end view of the preferred embodiment non-obstructive, auxiliary rear view mirror assembly.
Figure 2B:
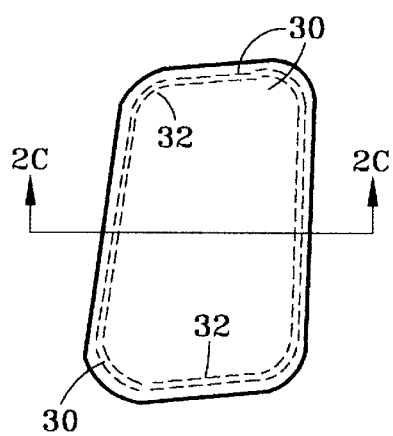
FIG. 2B is a front view of the preferred embodiment non-obstructive, auxiliary rear view mirror assembly, illustrating the overlapping alignment of the outer peripheral edge of the reflective mirror surface of the mirror body and the inner peripheral edge of the mounting bracket.
Figure 2C:
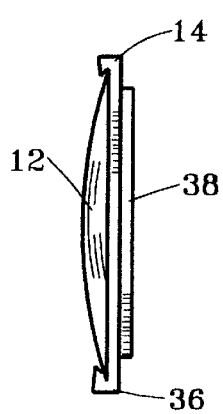
FIG. 2C is a cross-sectional view of FIG. 2B.
Figure 2D:
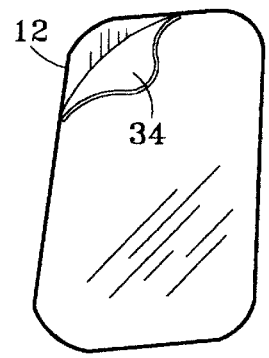
FIG. 2D is a front view of the preferred embodiment non-obstructive, auxiliary rear view mirror assembly, illustrating a removable protective coating applied to the reflective mirror surface.
Figure 2E:
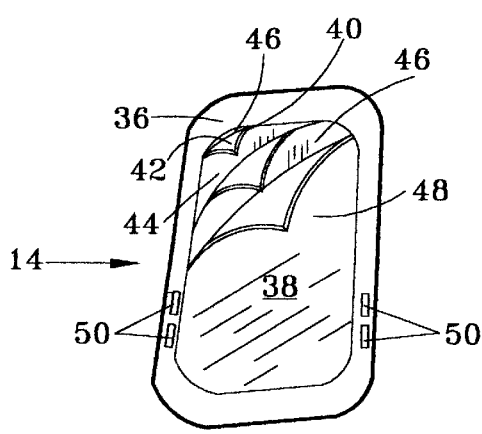
FIG. 2E is a rear view of the preferred embodiment non-obstructive, auxiliary rear view mirror assembly and mounting apparatus.

As depicted in FIG. 2A the convex mirror body 12 is received within the mirror body mounting bracket 14. The mirror body mounting bracket 14 includes a planar back portion 36 and an open front portion 25 with a curled edge 26 continuous along its outer periphery 28. The outer peripheral edge 30 of the mirror body 12 is received by the open front portion 25, by insertion of the peripheral edge 30 into the curled edge 26 of the mounting bracket 14. As seen in FIGS. 2B and 2C, the outer peripheral edge 30 of the mirror body 12 is minimally overlapped by an inner lip 32 of the curled edge 26 of the mounting bracket 14, to retain the mirror body 12. The curled edge 26 generally has a slightly larger circumference as compared to the circumference of the convex mirror body 12, in addition to the curled edge 26 being spring biased to receive and retain the convex mirror body 12. As depicted in FIG. 2D, the mirror body 12 may also include a removable, sheet-like coating 34 which protects the reflective convex mirror surface 13 during handling, packaging and shipping. In FIG. 2E the rear side 36 of the mounting bracket 14 is illustrated. The mounting apparatus of the present invention 10 may preferably include, but is not limited to a pressure sensitive, double sided adhesive strip 38, affixed to the back portion 36 of the mounting bracket 14. The adhesive strip 38 is substantial in size as compared to the back portion 36 of the mounting bracket 14 and accordingly, provides for a secure and strong attachment of the non-obstructive, auxiliary rear view mirror assembly and mounting apparatus 10. The adhesive strip 38 may preferably be comprised of a sheet-like, flexible material 40 having a first side 42 and a second side 44. A layer of adhesive 46 is applied to both sides 42, 44 of the sheet-like, flexible material 40. With the adhesive layers 46 in place, the first side 42 of the sheet-like, flexible material 40 is then attached to the rear side 36 of the mounting bracket 14. A removable adhesive covering 48 is attached to the second side 44 of the foam sheet 40 until the non-obstructive, auxiliary rear view mirror assembly and mounting apparatus 10 is to be permanently mounted. Additionally, there are at least four partially perforated or "punch out" eyelets 50 which can easily be removed to accommodate an alternate embodiment mounting bracket (not shown).

Figure 3:
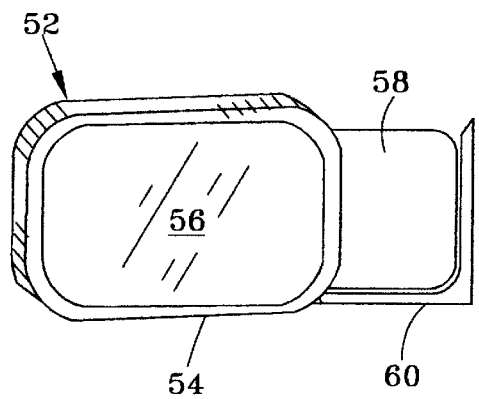
FIG. 3 is a front view of a driver's side, factory-mounted side view mirror assembly, as viewed by a driver positioned within a vehicle.

FIG. 3 illustrates a factory-mounted side view mirror assembly 52. The mirror assembly 52 may, for example, include a reflective mirror housing 54, a reflective mirror surface 56 retained and secured within the housing 54, a mounting support member 58 engaged to the housing 54, and a mounting bracket 60 in operative engagement to the support member 58 for mounting the assembly 52 to a vehicle (not shown). The mirror assembly 52 illustrated in FIG. 3 may, for example, be compatible with various factory-mounted side view mirror assemblies found on trucks, vans, mini vans, passenger vehicles, etc. manufactured by General Motors from 1991-present. The present invention non-obstructive, auxiliary rear view mirror assembly and mounting apparatus 10 can be used with a variety of different manufacturer's factory-mounted side view mirror assemblies (not shown) and is in no way restricted to the mirror assembly 52 illustrated in FIG. 3.

Figure 4A:
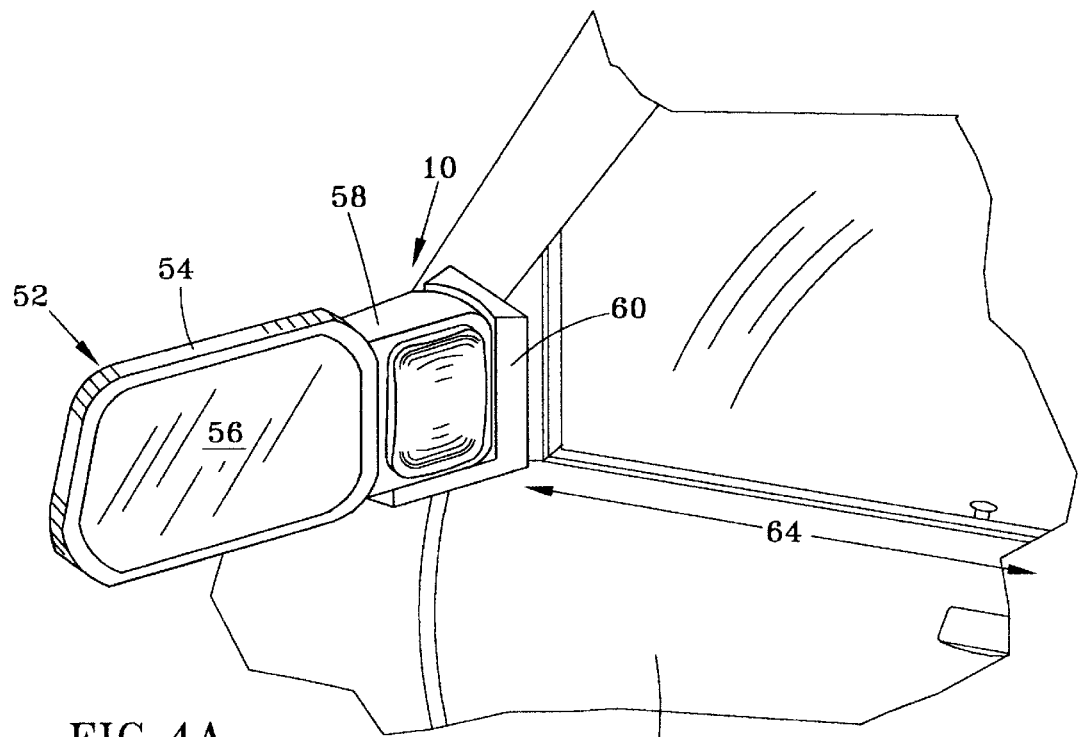
FIG. 4A is a perspective view of a driver's side, factory-mounted side view mirror assembly and the present invention mounted to a support member of the factory-mounted side view mirror assembly.

FIGS. 4A illustrates the factory-mounted side view mirror assembly 52, as it might be mounted to the driver's side of a vehicle 62. FIG. 4A also illustrates the mounting of the non-obstructive, auxiliary rear view mirror assembly and mounting apparatus 10 on the non-mirror reflective support member 58 of the mirror assembly 52, located between the reflective mirror surface 56 and an exterior surface 64 of the vehicle 62. As shown in FIG. 4A, the non-obstructive, auxiliary rear view mirror assembly and mounting apparatus 10 is preferably mounted to the support member 58 via the adhesive strip 38, wherein the support member 58 is located between the reflective mirror surface 56 of the factory-mounted side view mirror assembly 52 and the exterior surface of the vehicle 64 in the absence of obstruction of or contact with the reflective mirror surface 56 of the factory-mounted side view mirror assembly 52. Structure similar to that illustrated in FIG. 4A, is similarly numbered in FIG. 4B.

Figure 4B:
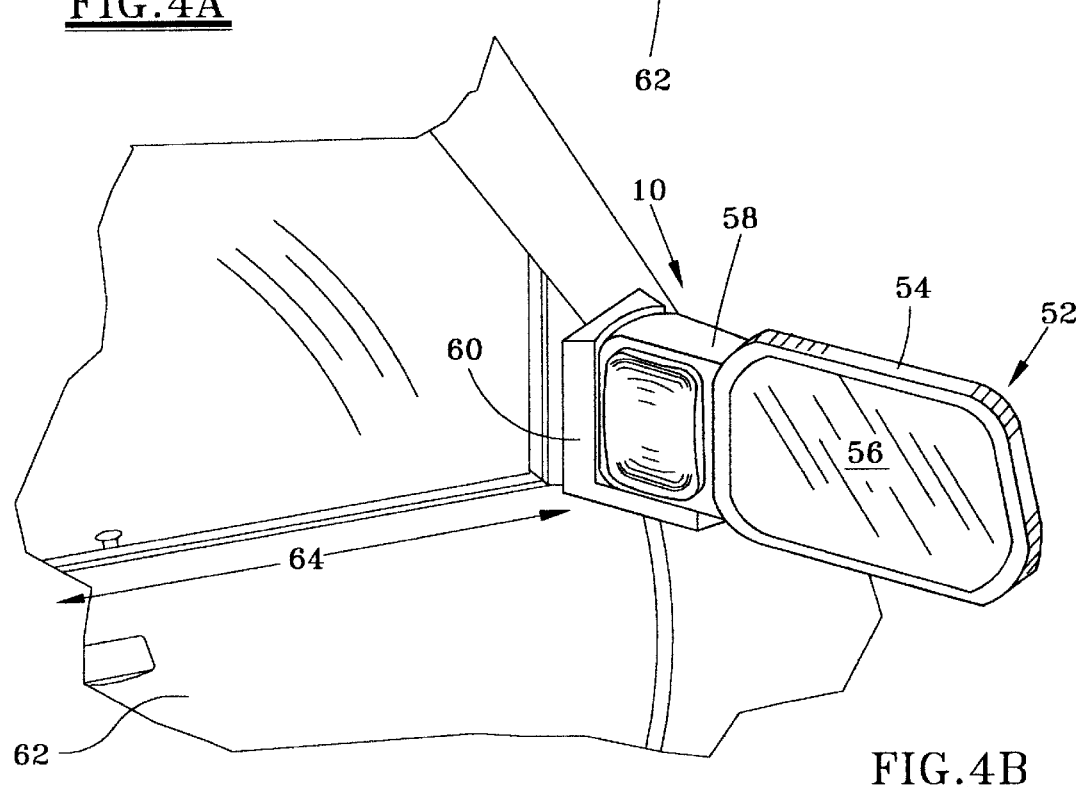
FIG. 4B is a perspective view of a passenger's side, factory-mounted side view mirror assembly and the present invention mounted to a support member of the factory-mounted side view mirror assembly.
Figure 4C:
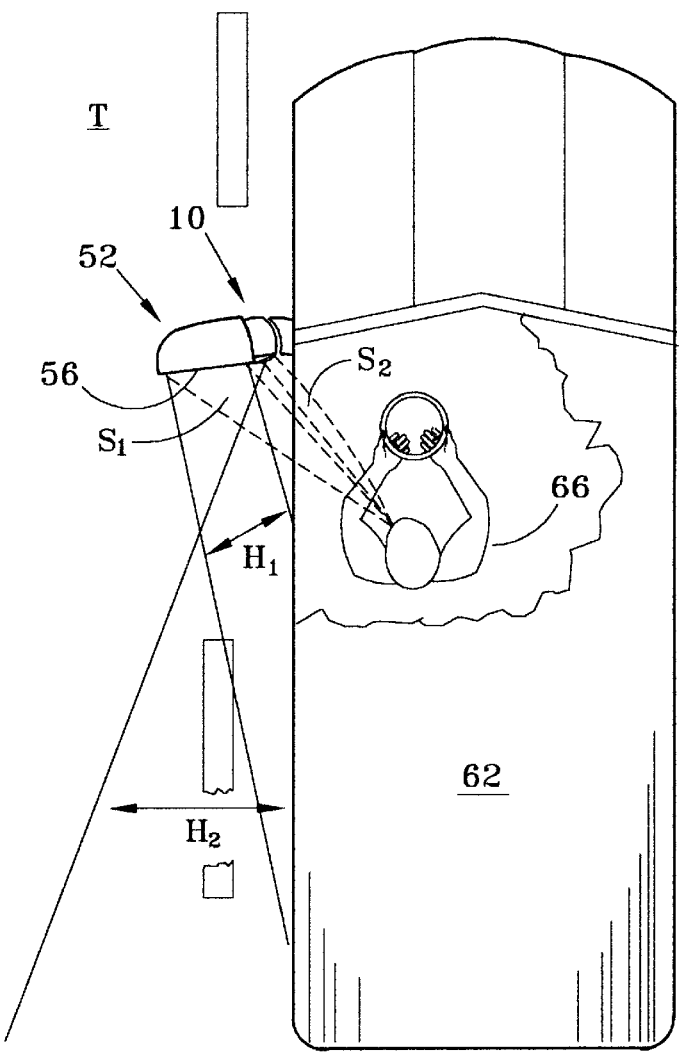
FIG. 4C is a top, partially cut-away view of the driver and vehicle, illustrating the driver's field of vision and view through the factory-mounted side view mirror assembly and through the present invention.

As depicted in FIG. 4C, a first view $S_1$ into the factory-mounted side view mirror 56 as viewed by a driver 66 of the vehicle 54 looking through the reflective mirror 56 of factory-mounted side view mirror assembly 52, is shown. As illustrated, the driver 66 has a restricted horizontal field of vision $H_1$ through the reflective mirror surface 56 and generally has no visual access to the blind spot which is generally included in horizontal field of vision $H_2$. The horizontal field of vision $H_2$ is however visible by the driver 66 by looking into the non-obstructive, auxiliary rear view mirror assembly 10 as illustrated in a second field of vision $S_2$. As illustrated, the first field of vision $S_1$ and the second field of vision $S_2$ do not overlap or otherwise converge upon each other.

Figure 4D:
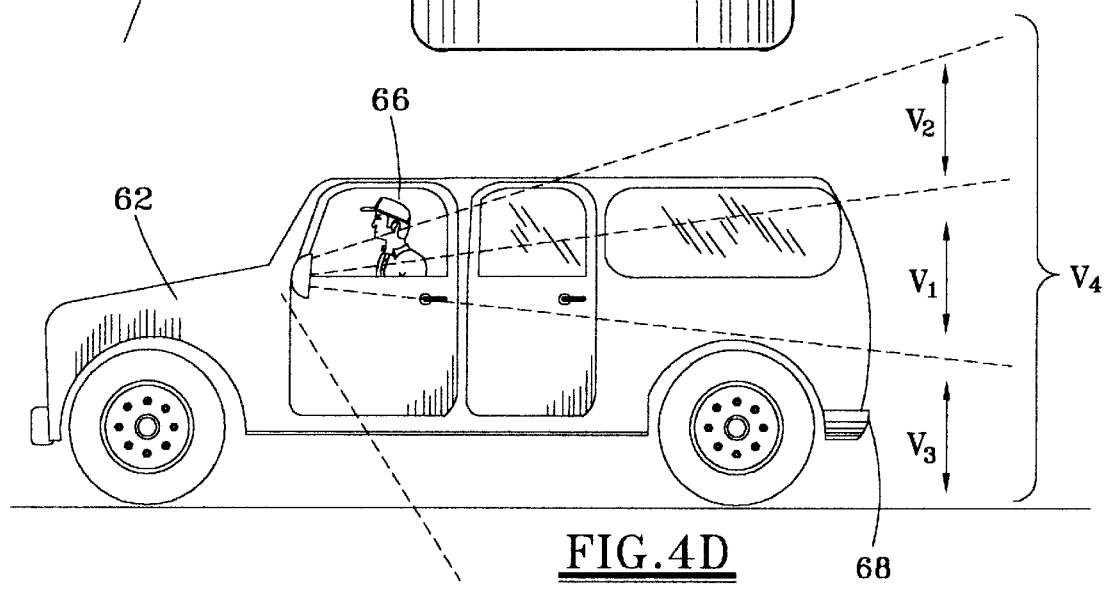
FIG. 4D is side view of the vehicle, illustrating the driver's view through the factory-mounted side view mirror assembly and through the present invention.

With reference to FIGS. 1A, 4C and 4D, the present invention generally provides a full view $H_2$ of the blind spot generally included in the horizontal field of vision $H_2$ in the absence of contact with or obstruction of the reflective mirror surface 56 of the factory-mounted side view mirror assembly 52. The non-circular, convex mirror body 12 of the present invention directs the driver's 66 view $S_2$ to the blind spot generally included in the horizontal field of vision $H_2$ of the vehicle 62, by providing a non-obstructive, non-circular, auxiliary convex mirror 12 with a substantially longer vertical X axis X, as compared to a substantially shorter horizontal Y axis Y. The longer X axis X of the non-obstructive, convex mirror body 12 generally provides the driver 66 with a full view $S_2$, $V_4$, $H_2$ to the enlarged horizontal field of vision $H_2$ which generally includes the blind spot, and may also include a view of the adjacent lanes of traffic T located in the horizontal field of view $H_2$ beginning at the position of the driver 66 and extending well past the vehicle's back bumper 68, as well as the upper, side portion $V_2$ of the vehicle 62, the middle, side portion $V_1$ of the vehicle 62, and the lower, side portion $V_3$ of the vehicle 62, without interfering, mounting anything thereon, or obstructing the driver's 66 view $S_1$ through the reflective mirror surface 56 of factory-mounted side view mirror assembly 52.

FIG. 5A depicts a front view of the auxiliary non-obstructive, convex mirror 10 mounted to the support member 58 of the factory-mounted side view mirror assembly 52. The non-obstructive, auxiliary rear view mirror assembly and mounting apparatus 10 is preferably mounted to the support member 58 of the factory-mounted side view mirror assembly 52 in such a manner that no portion of the non-obstructive, auxiliary rear view mirror assembly and mounting apparatus 10 is exposed laterally outboard of the factory-mounted side view mirror assembly 52, in the absence of obstructing or contacting any portion of the reflective mirror surface 56 of the factory-mounted side view mirror assembly 52. By mounting the non-obstructive, auxiliary rear view mirror assembly and mounting apparatus 10 wholly laterally inboard of the factory-mounted side view mirror apparatus 52, no portion of the non-obstructive, auxiliary rear view mirror assembly and mounting apparatus 10 is exposed to oncoming wind, airborne road debris or other substances (not shown) to which the front surface of the vehicle 62 may otherwise be exposed. FIG. 5B depicts a top view of the auxiliary non-obstructive, auxiliary rear view mirror assembly and mounting apparatus 10 mounted to the support member 58 of the factory-mounted side view mirror assembly 52, as illustrated in FIG. 5A.

FIG. 5C illustrates a top view of the auxiliary non-obstructive, auxiliary rear view mirror assembly and mounting apparatus 10 mounted to the support member 58 of the factory-mounted side view mirror assembly 52, wherein the factory-mounted side view mirror assembly 52 is in a collapsible or folding engagement to the mounting bracket 60 which secures the factory-mounted side view mirror assembly 52 to the vehicle 62. The mounting bracket 60 includes a vehicle mounting surface 70 which attaches to the respective exterior surface 64 of the vehicle 62, as shown in FIG. 4A and FIG. 4B. Opposite to the vehicle mounting surface 70, is a concave receiving surface 72 which corresponds matingly to a convex surface 74 of the support member 58. As the factory-mounted side view mirror assembly 52 rotates with respect to the mounting bracket 60, as shown in FIG. 5C, the non-obstructive, auxiliary rear view mirror assembly and mounting apparatus 10 is protectively received within the concave receiving surface 72 of the mounting bracket 60. Should the factory-mounted side view mirror assembly 52 encounter excessive wind forces, airborne road debris and unintentional contact with various objects (not shown), it is intended that the factory-mounted side view mirror assembly 52 be passive in response to such forces and fold inward toward the vehicle 62 to protect generally the reflective mirror surface 56 of the factory-mounted side view mirror assembly 52 and the auxiliary non-obstructive, auxiliary rear view mirror assembly and mounting apparatus 10. Moreover, the mounting of the non-obstructive, auxiliary rear view mirror assembly and mounting apparatus 10 on the support member 58 of the factory-mounted side view mirror assembly 52, wherein the non-obstructive, auxiliary rear view mirror assembly and mounting apparatus 10 is not exposed above, below or to the side of the factory-mounted side view mirror assembly 52 generally avoids many of the deficiencies of the known devices (not shown) which may require precarious or unstable mounting and exposure below, above and to the side of the factory-mounted mirror assembly 52.

Figure 8:
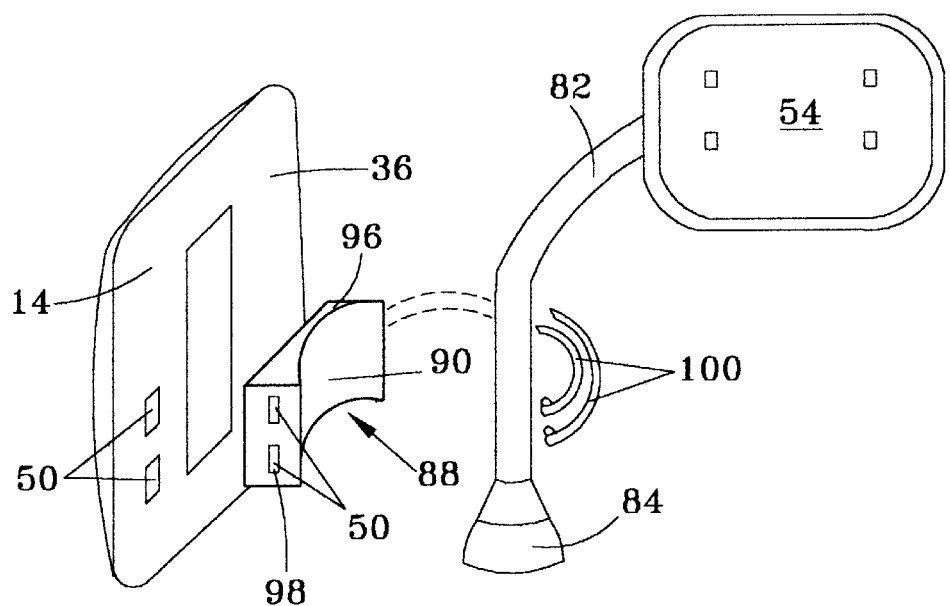
FIG. 8 is an exploded view of the first alternate embodiment non-obstructive, auxiliary rear view mirror assembly in combination with the first alternate embodiment, non-obstructive, mounting apparatus, in mounting engagement with the first alternate embodiment factory-mounted side view mirror assembly.
Figure 9:
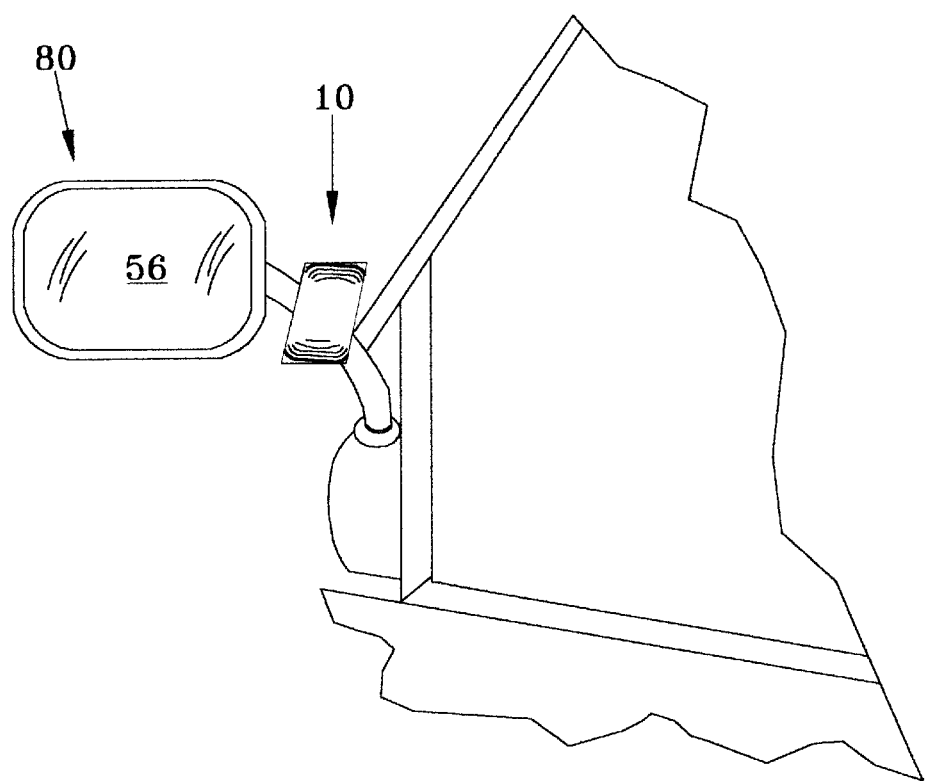
FIG. 9 is a perspective view of the first alternate embodiment factory-mounted side view mirror assembly with the non-obstructive, auxiliary rear view mirror assembly and first alternate embodiment mounting apparatus, mounted to a non-mirror reflective, support member of the first alternate embodiment factory-mounted side view mirror apparatus.

FIGS. 6A and 6B illustrate a first alternate embodiment factory-mounted side view mirror assembly 80. Structure similar to that illustrated in FIGS. 1–5C is similarly numbered in FIGS. 6A and 6B. The first alternate embodiment factory-mounted side view mirror assembly 80, generally includes a reflective mirror surface 56, a mirror housing 54 within which the reflective mirror surface 56 is retained and secured and a first alternate embodiment support member 82. The first alternate embodiment support member 82 is pivotally retained within a first embodiment mounting bracket 84 attached to the exterior surface 64 of the vehicle 62. A first alternate embodiment mounting apparatus 86 as illustrated in FIG. 7A. The first alternate embodiment mounting apparatus 86 includes an elongated body or member 87 having a first planar surface 88 for mounting to the back portion 36 of the mounting bracket 14, and may be comprised of rubber or polymer material. The elongated body 87 also has a concave second surface 90 for engagement to the first embodiment support member 82. As illustrated in FIGS. 7B and 7C, the first embodiment mounting apparatus 86 also preferably includes a plurality of snap pins 92 integrally formed in the first planar surface 88 and extending outwardly from, the first planar surface 88, said snap pins 92 being designed for engagement with and insertion through the eyelets 50 formed in the back portion 36 of the mounting bracket 14. The snap pins 92 may preferably include barbed ends 94 formed on the distal ends of the snap pins 92 for connective attachment within the eyelets 50 in the rear side 36 of the mounting bracket 14. The first embodiment mounting apparatus 86 also may preferably include a plurality of longitudinally positioned eyelets 51 disposed through the axial ends 96, 98 and extending the length of the elongated body 87, as depicted in FIGS. 7A and 8. As shown in FIG. 7D, one or more tie straps 100 may used to mount the first alternate embodiment mounting apparatus 86 to the first alternate embodiment support member 82. At least one tie strap 100 is first inserted through a longitudinal eyelet 51 in an end 98 of the first embodiment mounting apparatus 86, which is affixed to the back portion 36 of the mounting bracket 14, and is then wrapped around the first embodiment support member 82 and subsequently secured tightly at the second end 96 of the first embodiment mounting apparatus 86, thereby frictionally gripping the first alternate embodiment support member 82 therein. The arrangement of the non-obstructive, convex mirror body 12, mounting bracket 14 and first alternate embodiment mounting apparatus 86, including one or more tie straps 100 and first alternate embodiment support member 82 is illustrated in FIG. 8, as seen from the rear view of the mirror housing 54 and as seen from the front view of the reflective mirror surface 56 of the first alternate embodiment factory-mounted side view mirror assembly 80 in FIG. 9.

The foregoing description of the invention is illustrative and explanatory thereof. Various changes in the materials, apparatus, and particular parts employed will be apparent to those skilled in the art. It is intended that all such variations within the scope and spirit of the appended claims be embraced thereby.

What is claimed is:

1. A non-obstructive, auxiliary rear view mirror assembly and mounting apparatus to generally provide the driver of a vehicle with a full view of the vehicle's blind spot, while generally avoiding any obstruction of and contact to a reflective mirror surface of a collapsible factory-mounted side view mirror assembly, comprising:

a non-circular, convex mirror body;

a mounting bracket having a planar back portion and an open front portion to receive said non-circular, convex mirror body; and a mounting apparatus affixed to the back of said mounting bracket to affix said mounting bracket to a support member of the collapsible, factory-mounted side view mirror assembly, wherein said convex mirror body is positioned on the support member wholly laterally inboard of the factory-mounted side view mirror assembly, and said non-circular, convex mirror body and mounting bracket are mounted on the support member between a reflective mirror surface of the factory-mounted side view mirror assembly and an exterior surface of the vehicle, to provide cooperation between said convex mirror body and a fixed mounting bracket of the factory-mounted side view mirror assembly such that when said factory-mounted side view mirror is in a collapsed engagement to the fixed mounting bracket of the factory-mounted side view mirror assembly, there is no contact between said convex mirror body and the fixed mounting bracket of the factory-mounted side view mirror assembly.

2. The non-obstructive, auxiliary rear view mirror assembly and mounting apparatus, as defined in claim 1, wherein said mounting bracket is comprised of a polymer material.

3. The non-obstructive, auxiliary rear view mirror assembly and mounting apparatus, as defined in claim 1, wherein said mounting apparatus comprises a sheet-like, flexible material having a first side and a second side, the first side having a first coating of adhesive thereon and the second side having a second coating of adhesive material thereon, wherein the first coating of adhesive affixes the first side to a back portion of said mounting bracket.

4. The non-obstructive, auxiliary rear view mirror assembly and mounting apparatus, as defined in claim 3, wherein the second side and second coating of adhesive is releasably affixed to a removable adhesive covering.

5. The non-obstructive, auxiliary rear view mirror assembly and mounting apparatus, as defined in claim 4, wherein the removal of the adhesive covering of the second side and second coating of adhesive and contact of said second side and second coating of adhesive with the non-mirror reflective support member of the factory-mounted side view mirror assembly, generally provides the driver of the vehicle with full view of the vehicle's blind spot, in the absence of obstruction to any portion of the reflective mirror surface of the factory-mounted side view mirror assembly.

6. The non-obstructive, auxiliary rear view mirror assembly and mounting apparatus, as defined in claim 1, wherein said non-circular convex mirror body, said mounting bracket and said mounting apparatus attach to the support member of the factory-mounted side view mirror assembly, in the absence of exposing any portion of said non-circular convex mirror body, said mounting bracket and said mounting apparatus laterally outboard of the factory-mounted side view mirror assembly and in the absence of obstructing any portion of the reflective mirror surface of the factory-mounted side view mirror assembly.

7. The non-obstructive, auxiliary rear view mirror assembly and mounting apparatus, as defined in claim 1, wherein said non-circular, convex mirror body, said mounting bracket and said mounting apparatus attach to the support member of the factory-mounted side view mirror assembly, in the absence of exposing any portion of said non-circular, convex mirror body, said mounting bracket and said mounting apparatus to oncoming wind, to which the front surface of the vehicle may otherwise be exposed.

8. The non-obstructive, auxiliary rear view mirror assembly and mounting apparatus, as defined in claim 1, wherein said non-circular, convex mirror body, said mounting bracket and said mounting apparatus attach to the support member of the factorymounted side view mirror assembly, in the absence of exposing any portion of said non-circular, convex mirror body, said mounting bracket and said mounting apparatus to oncoming road debris, to which the front surface of the vehicle may otherwise be exposed.

9. The non-obstructive, auxiliary rear view mirror assembly and mounting apparatus, as defined in claim 1, wherein an x axis of said non-circular, convex mirror body is generally greater than a y axis of said non-circular, convex mirror body.

10. A non-obstructive, auxiliary rear view mirror assembly and non-obstructive mounting apparatus to generally provide the driver of a vehicle with a full view of the vehicle's blind spot, comprising:

a non-circular, convex mirror body, having generally a longer x axis as compared to a y axis;

a non-circular, mounting bracket being similarly shaped as said convex mirror body and having a planar back portion and open front portion, the planar back portion being designed for compact engagement with a support member of a factorymounted side view mirror assembly; and a mounting apparatus comprising a pressure sensitive, double-sided, adhesive strip affixed to the back of said mounting bracket to engage said mounting bracket and said convex mirror body to the support member of the factory-mounted side view mirror assembly such that when the factory-mounted side view mirror is in a collapsed engagement there is cooperation to avoid contact with or damage to the non-obstructive, auxiliary rear view mirror assembly and a fixed mounting bracket of the factory-mounted side view mirror assembly, wherein said convex mirror body and said mounting bracket are mounted wholly laterally inboard to the support member and positioned between a reflective mirror surface of the factory-mounted side view mirror assembly and an exterior surface of the vehicle, such that the non-obstructive, auxiliary rear view mirror assembly generally avoids contact with or obstruction of the reflective mirror surface of the factory-mounted side view mirror assembly at all times, to provide the driver of the vehicle with a full and non-obstructed view of the reflective mirror surface of the factory-mounted side view mirror and a full view of the vehicle's blind spot through said non-circular, convex mirror body.

\* \* \* \* \*